D. PUDLIN.
EYES FOR DOLLS.
APPLICATION FILED MAR. 21, 1919.
1,310,293.
Patented July 15, 1919.
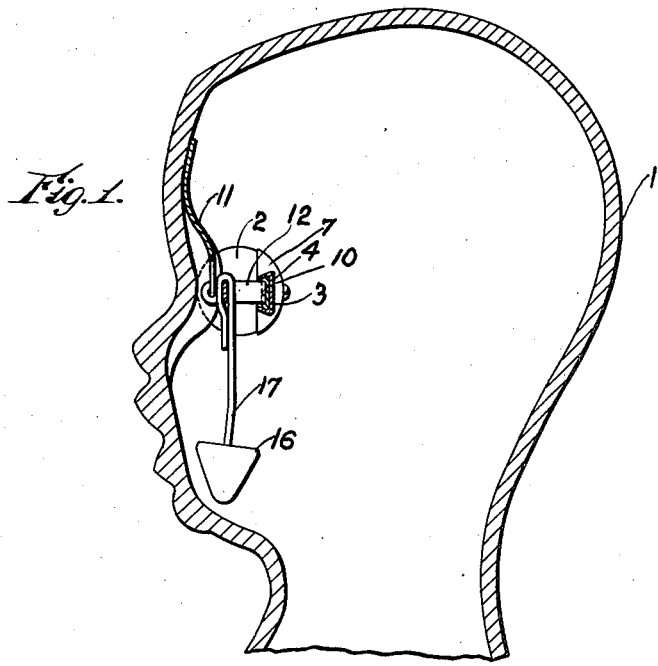
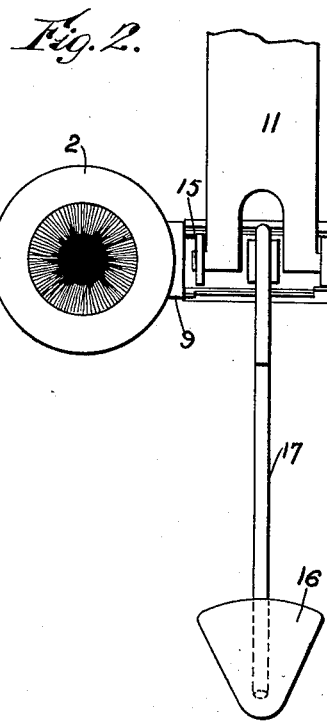
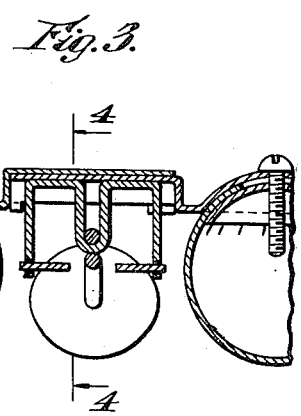
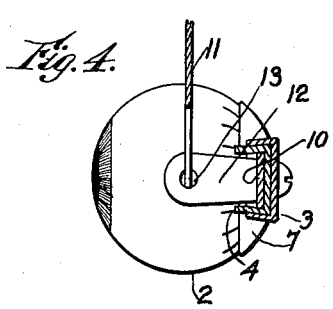
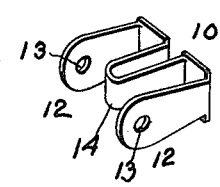
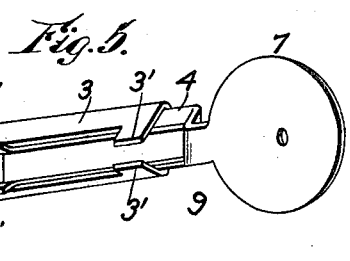
WITNESSES
INVENTOR
DAVID PUDLIN
BY
ATTORNEYS

UNITED STATES PATENT OFFICE.

DAVID PUDLIN, OF NEW YORK, N. Y.

EYES FOR DOLLS.

1,310,293.      Specification of Letters Patent.      Patented July 15, 1919.

Application filed March 21, 1919. Serial No. 283,959.

*To all whom it may concern:*

Be it known that I, DAVID PUDLIN, a citizen of the United States, and a resident of the city of New York, borough of the Bronx, in the county of Bronx and State of New York, have invented new and Improved Eyes for Dolls, of which the following is a full, clear, and exact description.

This invention relates to eyes for dolls and has for its general object to provide means for connecting the eyes together of novel, simple and inexpensive construction.

A more specific object of this invention is the provision of a metallic connecting piece between the eyes which is capable of being bent to properly adjust the eyes with respect to the inequalities of the eye sockets in the doll's head, and also capable of extension to accommodate the eyes to different spaced sockets for different size dolls' heads; the connecting piece being in the form of coacting metal stampings of durable form and so designed that the eyes can be readily and quickly adjusted to obtain their proper set.

A further specific object is to provide an eye carriage capable of being adapted to the inequalities of the eye socket and the different spacing of such eye sockets of various size dolls' heads and arranged to carry the head-piece attachments for such dolls' eyes and the counterweight. With these objects in view, the connecting piece for the eyes comprises two coacting metal stampings movable relatively to each other. The carriage complete comprises the connecting piece and a separate carrier supported by said connecting piece and projecting therefrom and movable therewith and so arranged as to carry the headpiece by means of a hinged connection and the counterweight by means of a rigid connection.

In the accompanying drawing illustrating the preferred embodiment of my invention similar characters of reference indicate corresponding parts in all the views.

Figure 1 is a side view partially in section of a doll's head showing my device arranged in operative position therein;

Fig. 2 is a front view partially broken away showing the general details of the eye carriage when assembled;

Fig. 3 is a section of Fig. 2 on the line 3—3;

Fig. 4 is a section of Fig. 3 on the line 4—4;

Fig. 5 is a perspective view of the connecting piece and the eye sockets employed in my present invention; and Fig. 6 shows the headpiece and counterweight carriage.

Referring to the drawing, 1 represents a doll's head of usual construction, 2 designates the eyes of the doll, and 3 and 4 the connecting piece therefor. The eyes are preferably hollow spherical bodies constructed substantially in the same manner as those described in United States Letters Patent No. 1,221,589, granted to me June 20, 1916, wherein the body of the eye 2 is formed with an opening 5, from which radiate slots 5' whereby the opening can be greatly enlarged for permitting the threaded washer or nut 6 to be inserted into the interior of the eyes. The connecting piece is formed of two elements 3 and 4 and is provided with shallow end sockets 7 and a perforation therein for the insertion of the screw bolt 8. The bolts 8 pass through the openings 5 in the eye and screw into the nut 6 whereby the eyes are firmly clamped between the nut 6 and the end sockets 7. The end sockets or seats 7 of the connecting piece are united to the two parts of the connecting pieces 3 and 4 by means of a bendable connection 9 which permits the sockets or eye seats to be adjusted longitudinally to produce the proper set of the eyes. This adjustment is made necessary as the doll's heads are not always uniform and such inequalities necessitate certain adjustments.

The connecting piece, as we have before stated, is formed of two members, one relatively movable to the other or, as shown in the drawing, one telescoping within the other. These pieces are formed of channel section, and the walls of such channel section are bent inward so that the parts will not separate when moved. These two elements are provided with projecting tongues or lugs 3' and 4', the use of which will be disclosed hereafter. The carrier 10 for the head piece 11 is constructed of metal stamping provided with two projecting arms 12 having sockets 13 therein, and with a loop 14. The connecting portion of the carrier is of a width corresponding to the channel formed in the element 4 of the connecting piece. This carrier is inserted within the channel of the connecting piece 4, and the lugs 3' and 4' are bent forward and backward so as to prevent the said carrier from becoming disengaged with the connecting piece. The two arms of the carrier are designed to receive in the sockets 13 extensions or trunnions 15 of the headpiece whereby a hinge is formed between the headpiece 11 and the carrier 10. The loop 14 is designed to carry the counterweight 16, and the counterweight bar 17 is designed to be bent over and tightly clamped against this loop so that when the carrier 10 is in position in connection with the connecting piece 3 and 4 the eyes are in rigid connection relative to their rotary movement in connection with the said counterweight 16, and the operation of the counterweight and connecting piece is entirely independent of its connection with the headpiece 11 owing to the hinged connection between said headpiece and the carrier.

It will be observed that the present construction permits not only the adjustment of the eyes relative to the inequalities of the interior casting of the eye sockets of the doll's head, but also permits the use of one size of eye for several sizes of the dolls' heads and permits the setting or locking of the eyes for each size of dolls' heads in position by means of pinching outward and inward the lugs 3′ and 4′ of the carrier parts.

Therefore, it will be perceived that while the foregoing is one of the great advantages of the applicant's device, there is still another advantage, from the fact that all of the elements necessary to connect and operate the eyes of a toy doll are united in one carrier and that the same is not only capable of adjustment to the shape of the head by means of the headpiece 11, which is constructed of bendable material, but is also adjustable to the inequalities of the interior of the castings of the eye socket and is also adjustable to different spacings of eye sockets.

The foregoing description taken in connection with the drawing forming a part thereof illustrates a device embodying the best form of my device, but I do not wish to limit myself to the specific construction shown, as other equivalents may be used within the scope of my invention.

What I claim and desire to secure by Letters Patent, is:

1. The combination of a set of eyes with a connecting piece composed of channel bars relatively movable to each other and provided with terminal seats for the eyes, and means for fastening the eyes to said seats, the said connecting piece being bendable at the juncture of the seats with the bars.

2. The combination of a set of eyes with a connecting device comprising two pieces of metal provided with shallow end sockets for the eyes and so shaped that the one may telescope within the other, and fasteners for securing the eyes in said sockets.

3. The combination of a set of eyes with a connecting device comprising two pieces of metal shaped with shallow end sockets and formed of coacting channel sections so that the two parts may be relatively movable to each other, and fasteners securing the eyes to said sockets, there being a bendable portion between the sockets and the channel portion of the connecting device permitting the eyes to be adjusted.

4. The combination of a set of eyes with a connecting piece comprising an expansible bar, and terminal fastening pieces for the eyes, the said connecting piece being bendable at the ends of the bar.

5. The combination of a set of eyes with a connecting piece comprising an expansible bar, a carrier suitably secured to such expansible bar, a counter weight and a head piece, and means on said carrier for retaining the counterweight in rigid position relative to the normal position of the eyes, and means on said carrier for rotatably connecting the headpiece with said carrier.

6. An eye carriage comprising in combination a set of eyes, an expansible bar connecting said eyes, said bar being bendable at the ends thereof carrying the eyes, bendable means pivotally connecting with said carriage for attaching the same to the doll's head, and gravity means for maintaining the eyes relative to the position of the doll's head.

7. In combination with a doll's head, a carriage so constructed as to permit longitudinal extension and lateral adjustment thereof and means rotatably attached to said carriage adapted to maintain the same in relative adjustment to the doll's head, and gravity means rigidly attached to said carriage for maintaining the eyes in the same position with relation to any movement of the doll's head.

8. A carriage for a set of doll's eyes comprising two channel bars, one telescoping within the other and provided with eye sockets at the terminals thereof, a counterweight and a head piece, the said bars being bendable between the channel sections thereof and such sockets, a carrier adapted to fit within one of the said channel bars and having a pivotal connection with a head piece and rigid connection with a counterweight, and means for maintaining said carrier in connection with the said carrier members.

DAVID PUDLIN.